US009292266B2

United States Patent
Motta et al.

(10) Patent No.: US 9,292,266 B2
(45) Date of Patent: Mar. 22, 2016

(54) PREPROCESSOR FOR FILE UPDATING

(75) Inventors: Giovanni Motta, San Diego, CA (US); Sait Can Saydag, San Diego, CA (US); Ashish Varma, San Diego, CA (US); Fu Jun Wu, Rancho Bernardo, CA (US)

(73) Assignee: QUALCOMM INCORPORATE, San Diego, CA (US)

( * ) Notice: Subject to any disclaimer, the term of this patent is extended or adjusted under 35 U.S.C. 154(b) by 235 days.

(21) Appl. No.: 13/641,279

(22) PCT Filed: Apr. 30, 2010

(86) PCT No.: PCT/US2010/033261
§ 371 (c)(1),
(2), (4) Date: Oct. 15, 2012

(87) PCT Pub. No.: WO2011/136809
PCT Pub. Date: Nov. 3, 2011

(65) Prior Publication Data
US 2013/0039252 A1  Feb. 14, 2013

(51) Int. Cl.
*G06F 9/44* (2006.01)
*G06F 9/45* (2006.01)
*G06F 9/445* (2006.01)

(52) U.S. Cl.
CPC .. *G06F 8/41* (2013.01); *G06F 8/36* (2013.01); *G06F 8/65* (2013.01)

(58) Field of Classification Search
CPC ............... G06F 8/65; G06F 8/68; G06F 8/71; G06F 9/445
USPC ................................. 717/168–173
See application file for complete search history.

(56) References Cited

U.S. PATENT DOCUMENTS

| 7,058,941 | B1 * | 6/2006 | Venkatesan et al. .......... 717/168 |
| 7,275,239 | B2 * | 9/2007 | Cuomo ............... G06F 11/3624 714/E11.207 |
| 7,665,081 | B1 | 2/2010 | Pavlyushchik |
| 2003/0212712 | A1 * | 11/2003 | Gu et al. ........................ 707/200 |
| 2004/0015896 | A1 * | 1/2004 | Dornan et al. ................ 717/139 |
| 2004/0062130 | A1 * | 4/2004 | Chiang ..................... G06F 8/68 365/230.03 |
| 2004/0177343 | A1 * | 9/2004 | McVoy et al. ................. 717/122 |
| 2004/0260734 | A1 | 12/2004 | Ren et al. |
| 2005/0010576 | A1 | 1/2005 | Ren et al. |
| 2007/0016629 | A1 | 1/2007 | Reinsch |
| 2007/0118724 | A1 * | 5/2007 | Patel ................... G06F 9/30174 712/202 |

(Continued)

OTHER PUBLICATIONS

International Search Report and Written Opinion received in PCT Application No. PCT/US2010/033261, mailed Jan. 21, 2011, 9 pages.

*Primary Examiner* — Duy Khuong Nguyen
(74) *Attorney, Agent, or Firm* — Kilpatrick Townsend & Stockton LLP

(57) ABSTRACT

A method for updating a computer the includes converting a first computer the to executable byte code and receiving a second computer the that includes a change that distinguishes the second computer file from the first computer file. The method also includes converting the second computer the to executable byte code and comparing at least a portion of the executable byte code of the second computer file with at least a portion of the executable byte code of the first computer file. The method further includes inserting, into the executable byte code the first computer file, a modification that causes at least a portion of the executable byte code of the first computer the to resemble the executable byte code of the second computer file.

13 Claims, 6 Drawing Sheets

(56) References Cited

U.S. PATENT DOCUMENTS

| | | | |
|---|---|---|---|
| 2008/0040401 A1* | 2/2008 | Reinsch | 707/203 |
| 2008/0059959 A1 | 3/2008 | Chen et al. | |
| 2010/0218174 A1* | 8/2010 | Schneider | G06F 8/41 717/148 |
| 2011/0093836 A1* | 4/2011 | Galicia et al. | 717/139 |
| 2011/0093841 A1* | 4/2011 | Meller et al. | 717/168 |

* cited by examiner

Figure 4

| | T1(i)-T1(i-1) | | T2(i)-T2(i-1) |
|---|---|---|---|
| 00 00 00 00 | 00 2b 38 6a | 00 00 00 00 | 00 2b 39 5a |
| 00 00 00 04 | 00 00 00 02 | 00 00 00 04 | 00 00 00 02 |
| 00 00 00 08 | 00 00 00 03 | 00 00 00 08 | 00 00 00 03 |
| 00 00 00 0c | 00 00 00 03 | 00 00 00 0c | 00 00 00 06 |
| 00 00 00 10 | 00 00 00 03 | 00 00 00 10 | 00 00 00 03 |
| 00 00 00 14 | 00 00 00 04 | 00 00 00 14 | 00 00 00 03 |
| 00 00 00 18 | 00 00 00 04 | 00 00 00 18 | 00 00 00 04 |
| 00 00 00 1c | 00 00 00 05 | 00 00 00 1c | 00 00 00 04 |
| 00 00 00 20 | 00 00 00 04 | 00 00 00 20 | 00 00 00 05 |
| 00 00 00 24 | 00 00 00 1c | 00 00 00 24 | 00 00 00 04 |
| 00 00 00 28 | 00 00 00 16 | 00 00 00 28 | 00 00 00 1c |
| 00 00 00 2c | 00 00 00 14 | 00 00 00 2c | 00 00 00 16 |
| 00 00 00 30 | 00 00 00 05 | 00 00 00 30 | 00 00 00 14 |
| 00 00 00 34 | 00 00 00 15 | 00 00 00 34 | 00 00 00 05 |
| | | 00 00 00 38 | 00 00 00 15 |

| | String ID Table File 1 | | String ID Table File 2 |
|---|---|---|---|
| 00 00 00 00 | 00 00 02 00 | 00 00 00 00 | 00 00 02 00 |
| 00 00 00 04 | 00 00 02 10 | 00 00 00 04 | 00 00 02 0c |
| 00 00 00 08 | 00 00 02 1a | 00 00 00 08 | 00 00 02 10 |
| | :::::: | 00 00 00 0c | 00 00 02 1A |
| | | | :::::: |

"PREPROCESSOR FOR FILE UPDATING

BACKGROUND

Updating wireless remote devices by way of a wireless communications channel can be an expensive proposition. In one example, updates are "pushed" from a base station that services hundreds or even thousands of remote devices. Given that significant channel bandwidth may be required to perform these updates, and given the price that cellular users must pay in order to make use of this bandwidth, it is advantageous to reduce the bandwidth required to perform the updates.

In addition, the capacity of the server used by the cellular operator to deliver the update package must be scaled in proportion to the time required to perform the update. For example, in the event that the server is capable of delivering 100 simultaneous update streams, with one update stream for each wireless device, an update that requires 60 seconds implies that the server must operate at capacity for 60 seconds in order to deliver the update. An update that requires twice this amount of time implies that delivering the 100 simultaneous update streams requires the server to operate at capacity for a full 120 seconds. Thus, in addition to benefiting individual cellular users, reducing the size of an update benefits cellular operators as well.

BRIEF DESCRIPTION OF THE DRAWINGS

FIG. 4 shows a table of pointers from a software version 1 after preprocessing that involves the computation between adjacent pointers according to an embodiment of the invention.

FIG. 8-9 are diagrams showing a string ID table file as well as pointers to memory locations at which the string can be found according to an embodiment of the invention.

DESCRIPTION OF THE EMBODIMENTS

In a wireless communications system, updates to wireless client devices take place by way of the channel used to communicate transmit and receive messages to and from the client device. As such, any software updating and other procedures that might consume communications channel bandwidth represents an expense to the cellular operator and perhaps to the user of the client device. Further, large update packages can consume extensive server resources of the cellular operator, perhaps forcing servers delivering the update to operate at capacity for long periods of time. Accordingly, it is advantageous to reduce the size of the software update package to a minimum so as to consume the smallest amount of resources as possible to perform the update.

In various embodiments of the invention, a first computer file is converted to byte code that includes a data section, in which tables of strings and tables of references are located, and a section that includes the executable code and also contains references to the data section. The executable byte code may resemble Java byte code that is executed step-by-step by way of a Java Virtual Machine or by way of a Java interpreter. In other instances, byte code of a Dalvik executable file, which to some extent resembles but is not identical to Java byte code, is used. In either event, the byte code structure arranged by the interpreter according to a first version of source code is modified according to a second version of source code. The resulting byte code-level modifications include changes that bring a first version of software into line with a second version of software. For background, an exemplary file structure of a Dalvik executable file is presented in FIG. 1.

For those embodiments in which the executable byte code is derived from Java source code that resembles a Dalvik executable file, the inventors contemplate that this type of executable file represents a compact file structure. In this file structure, a string table represents the largest and the dominant portion of the file structure. The string table is either indirectly or directly referenced by the majority (if not all) of the other tables in the structure of the executable files and by the code section.

Figure 1:
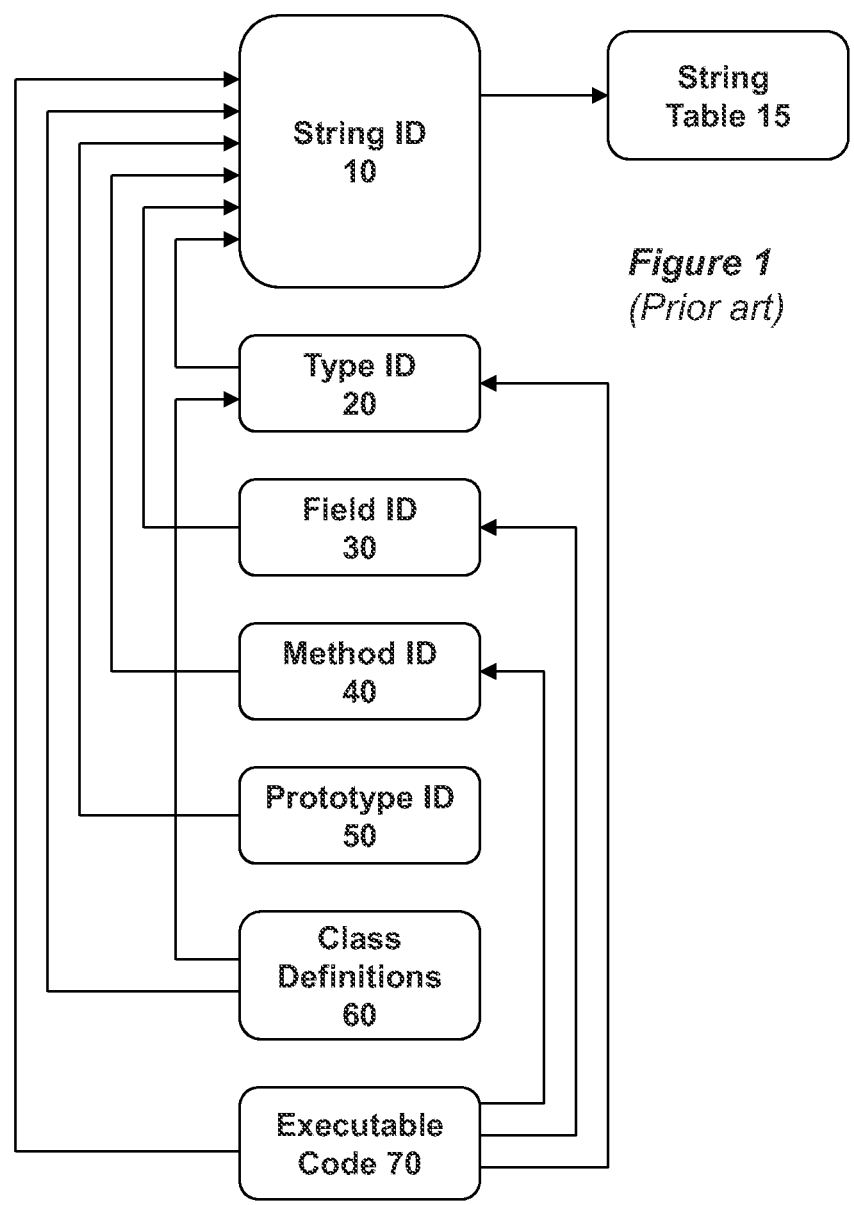
FIG. 1 shows the structure of a Dalvik executable file in accordance with the prior art.

In FIG. 1, type ID table 20, field ID table 30, method ID table 40, prototype ID table 50, class definition table 60, and executable code 70 all reference string ID table 10. String ID table 10, references string table 15. Executable code 70 additionally references method ID table 40, field ID table 50, and type ID 20. Class definitions table 60 further references type ID table 20. Embodiments of the invention employ file structures in which the various types, fields, methods, prototypes, class definitions, executable code repositories, and string tables as shown in the Figure comprise a program that might be performed on a wireless client device or on any one of a broad spectrum of remote client devices that communicates with a centralized server using a wireless or a wired interface.

Figures 2, 3:
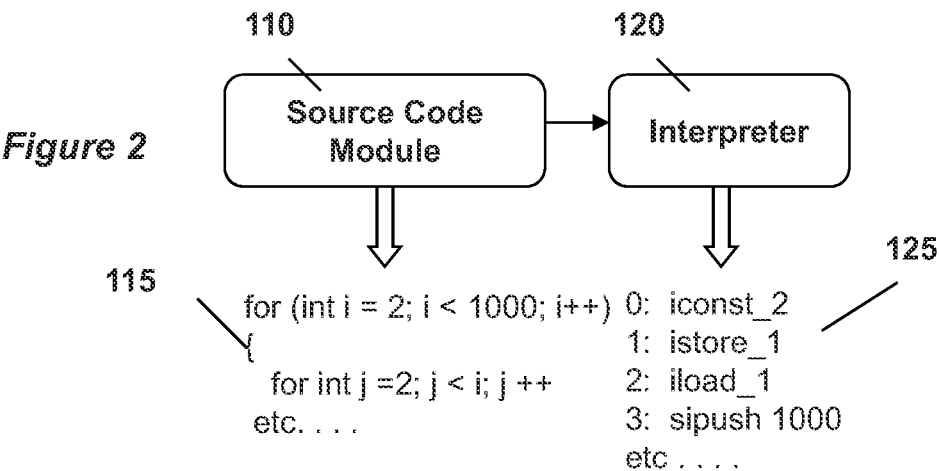
FIG. 2 shows the conversion of exemplary source code to byte code for an exemplary portion of a Java program according to an embodiment of the invention.
FIG. 3 shows two pointer tables and the locations of the pointers in memory.

FIG. 2 shows the conversion of exemplary source code to byte code for an exemplary portion of a Java program according to an embodiment of the invention. In FIG. 2, source code module 110, which includes variables, objects, and so forth, selected by the computer programmer along with operations to be performed on the variables is converted to Java byte code using interpreter 120. When interpreter 120 receives and processes input source code 115 encapsulated within source code module 110, Java byte code 125 results. The Java byte code shown in FIG. 2 is suitable for use by a Java Virtual Machine.

In FIG. 2, source code module 110 is converted to byte code such as DEX, ODEX, or JAR, which are highly structured objects. These objects may include tables of pointers to strings, references to pointers, variables, functions, class definitions, and other objects of executable byte code as shown and described with reference to FIG. 1. When source code is added or deleted, perhaps to expand or to simplify a function, interpreter 120 may propagate these changes to several locations within the structure of byte code 125. The inventors contemplate that when the source code is modified by the programmer, the compiler/interpreter rearranges this code causing many of the references to differ. Changes introduced by the compiler to accommodate primary changes made by the programmer are referred to as "secondary changes"."

FIG. 3 shows two pointer tables and the locations of the pointers in memory. In FIG. 3, byte memory locations 140 indicate the memory locations that are pointed to by the pointers in table file 1, 150. Also in FIG. 3, byte memory locations 160 indicate the memory locations that are pointed to by the pointers in table file 2, 170. Table files 1 and 2 represent version 1 and version 2 of software loaded (or to be loaded) on a wireless client device, with version 2 being an update to version 1. In table file 2, 170, each pointer points to the same objects as in table file 1, 160, but with each object of version 2 stored in a different memory location. Note that in version 2 a new object has been added (in bold) in table file 2 (170).

In pseudocode, a typical implementation that might be used to encode the changes to convert table file 1 (150) into table file 2 (170) might be expressed as:

```
Copy 2, 0       // Copy 2 bytes starting from offset 0
Add 2, 39, 5a   // Add the 2 bytes 39 and 5a
Copy 0b, 4      // Copy 11 bytes (0b) starting from offset 4
Add 1, 06       // Add byte 06 - new item
Copy 2c, 10     // Copy 44 bytes (2c) starting from offset 10
```

In the above pseudocode, the first bytes of FIG. 3 are stored (00 2b), followed by the bytes 39 and 5a. After these bytes are stored, the 2 bytes beginning at offset 4 (00 2b) are stored followed by the addition of bytes 39 and 5c. At this point it can be seen that copying the material of table file 1, 150, into table file 2 (170) requires 2 instructions for every 4 bytes. Thus, a large number of instructions are likely to be needed to copy the contents of table file 170 into table file 150.

FIG. 4 shows a table of pointers from a software version 1 after preprocessing that involves the computation between adjacent pointers according to an embodiment of the invention. In FIG. 4, a starting pointer location and the difference between the starting pointer location and subsequent pointer locations are shown. Thus, for a software version 1, the first entry of table file 180 represents the starting address of table file 1, 150, of FIG. 3. The elements of table file 180 (T1(*i*)−T1(*i*−1)) represent the differences between the current and subsequent pointer values of software version 1. Table file 190, entitled T2(*i*)−T2(*i*−1), shows the differences between current and subsequent pointer values of version 2. In accordance with an embodiment of the invention in which table file 180 is used as a reference, table file 190 can be encoded as:

```
Copy 2, 0       // Copy 2 bytes starting from offset 0 {00 2b}
Add 2, 39, 5a   // Add the 2 bytes 39 and 5a {39 5a}
Copy 0b, 4      // Copy 11 bytes (0b) starting from offset 4
                {00 00 00 02 00 00 00 03 00 00 00}
Add 1, 06       // Add byte 06 - {new item}
Copy 2c, 10     // Copy 44 bytes starting from offset 10
                {00 00 00 03 00 00 00 03 00 00 00 04 00 00 00
                04 00 00 00 05 00 00 00 04 00 00 00 1c 00 00
                00 16 00 00 00 14 00 00 00 05 00 00 00 15}
```

Thus, as can be seen from the pseudocode above, the first pointer is stored verbatim {00 2b}. The following 2 bytes are then stored (39 5a). An additional 11 bytes are stored starting from offset 4. The new item is then stored (byte 06) followed by the remaining 44 bytes of the table Thus, after preprocessing, table file 190 of FIG. 4 can be stored with the above 5 instructions using table file 150 as a reference.

Figure 5:
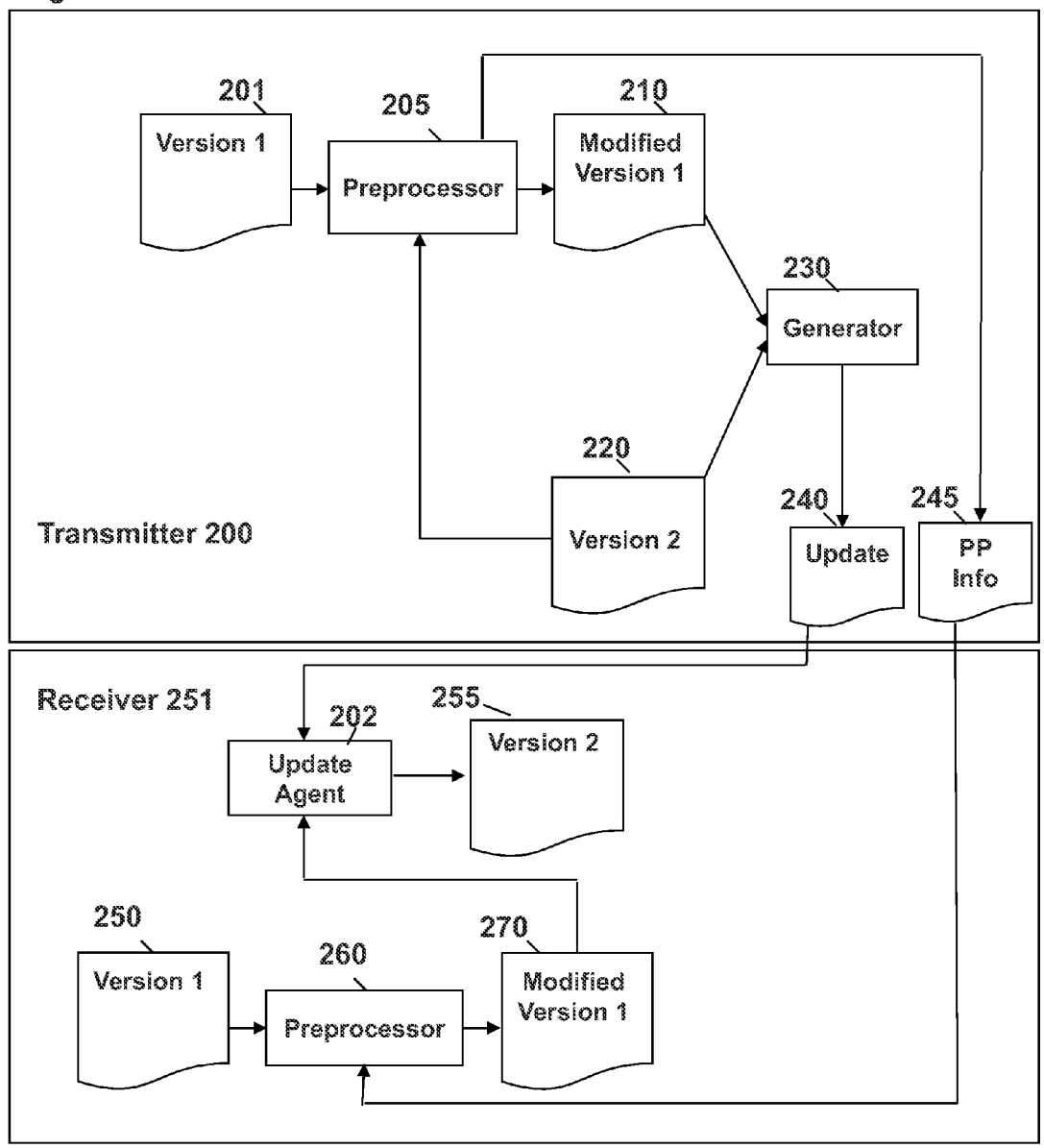
FIG. 5 is a block diagram showing a method for using a preprocessor to perform file updating according to an embodiment of the invention.

FIG. 5 is a block diagram showing a method for using a preprocessor to perform file updating according to an embodiment of the invention. The method of FIG. 5 may be used with executable files in which the pointer values are monotonically increasing or are otherwise arranged in an orderly structure Additionally, a method that makes use of the system of FIG. 5 might be desirable when the receiving (client) device does not possess the processing bandwidth to reconstruct the pointer locations discussed with reference to FIG. 4.

In general, a method that accords with the system of FIG. 5 creates an updated version of a software package by copying a previous version of software into a memory and adding material to the copied version that is not present in the previous version. In the embodiment of FIG. 5, a preprocessor compares the length of a string and the characters within the string and identifies a match when the length and characters of the strings are identical. As an example, the method of FIG. 5 might begin with version 1 as a baseline within transmitter 200 and subsequently copies into version 1 the material that distinguishes version 2 from version 1. Preprocessor 205 additionally prepares preprocessor information (PP Info, at block 245) which includes side information such as flags, rule sets for making changes to executable file tables, and so forth.

Continuing with the method of FIG. 5, preprocessor 205 computes the differences between version 1 (201) and version 2 (220), in which each of the versions includes a table that identifies string IDs and pointers that correspond to a memory location. In the embodiment of FIG. 5, version 1 and version 2 are Dalvik executable files that contain string tables and code references within the file structure. Preprocessor 205 replaces byte code entries of version 1 with byte code entries from version 2 that differ from the entries of version 1, thus creating modified version 1 (210). In this embodiment, modified version 1 is made to resemble version of 2 to the maximum extent possible. Modified version 1 and version 2 are then compared using generator 230 which generates an update package that encapsulates the differences between modified version 1 and version 2 using a minimum number of instructions. An output of generator 230 is update package 240.

At a receiver (251), such as a remote client device, version 1 (250) represents the current software version operating on the client device. Preprocessor 260 operates on version 1 according to the rules and other information provided by preprocessor info 245 to arrive at modified version 1 (270). This information, along with update 240 is combined within update agent 202 to form version 2 (255). In this embodiment, preprocessor 260 proceeds pointer by pointer in generating modified version 1 from version 1.

Figure 6:
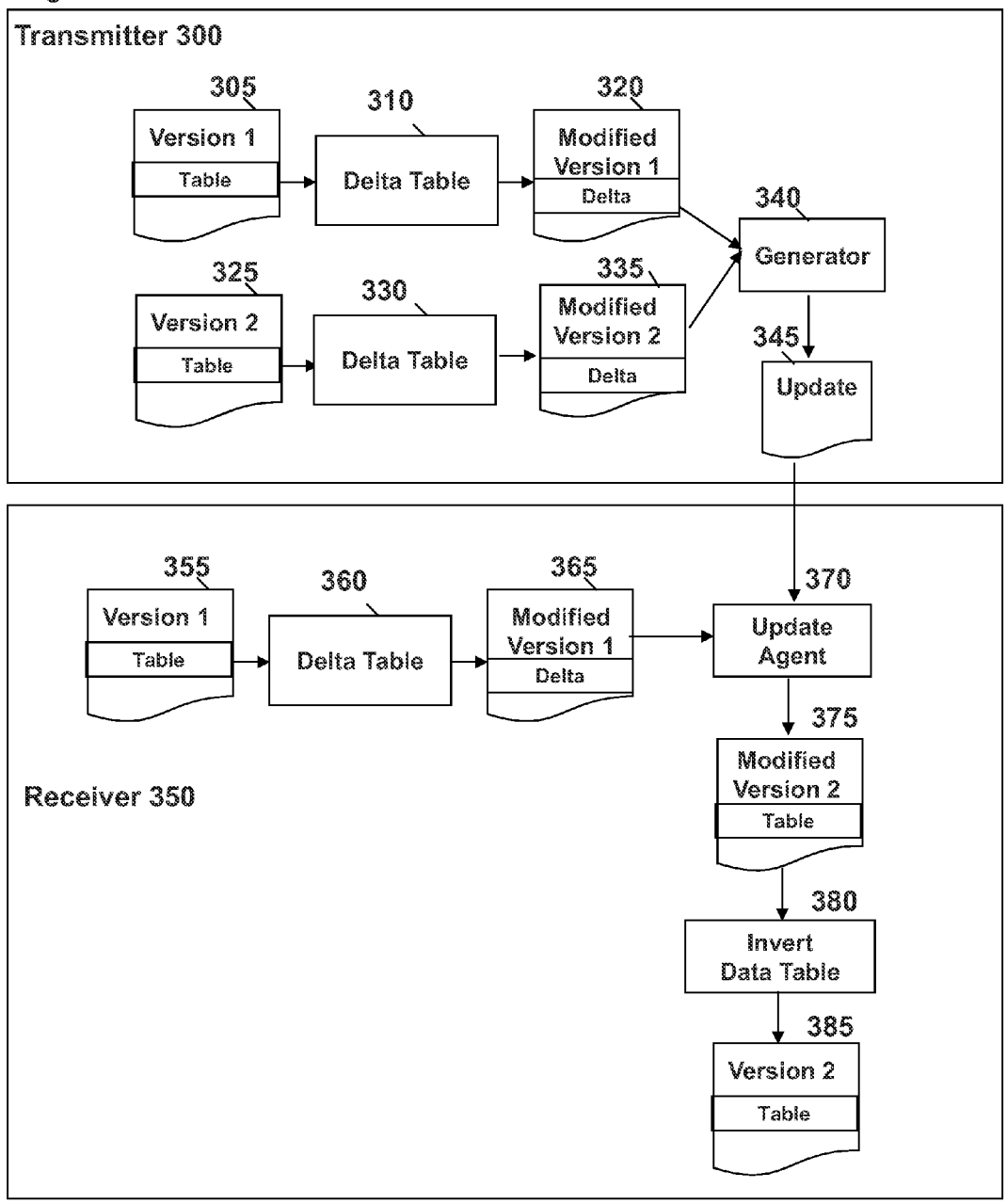
FIG. 6 is a block diagram showing a method for using a preprocessor to perform file updating according to another embodiment of the invention.

FIG. 6 is a block diagram showing a method for using a preprocessor to perform file updating according to another embodiment of the invention. FIG. 6 may be advantageous when pointer tables of the executable files are not strictly ordered but may perhaps be scattered throughout the executable code. In a first embodiment, the preprocessor does not examine the byte code file for changes. The preprocessor merely computes the difference between adjacent entries in the tables. In transmitter 300, the differences between version 1 (305) and version 2 (325) and version 2 are computed and stored in delta table 310 and delta table 330, respectively. Delta table 310 is then used to construct modified version of 1 (320). In a similar manner, delta table 330 is then used to construct modified version 2 (335). Within generator 340, these are compared resulting in update package 345.

At receiver 350, modified version 1 (365) is constructed using delta table 360 by computing the differences between consecutive entries between version 1 (355). At update agent 370, modified version 1 (365) and update 345 are compared to produce modified version 2 (375). At this point, the inventors contemplate that modified version 2 (375) will include differences in pointer locations, but will not include the absolute memory locations of the pointers. And at invert data table 380 the data table is inverted resulting in version 2 (385).

Figure 7:
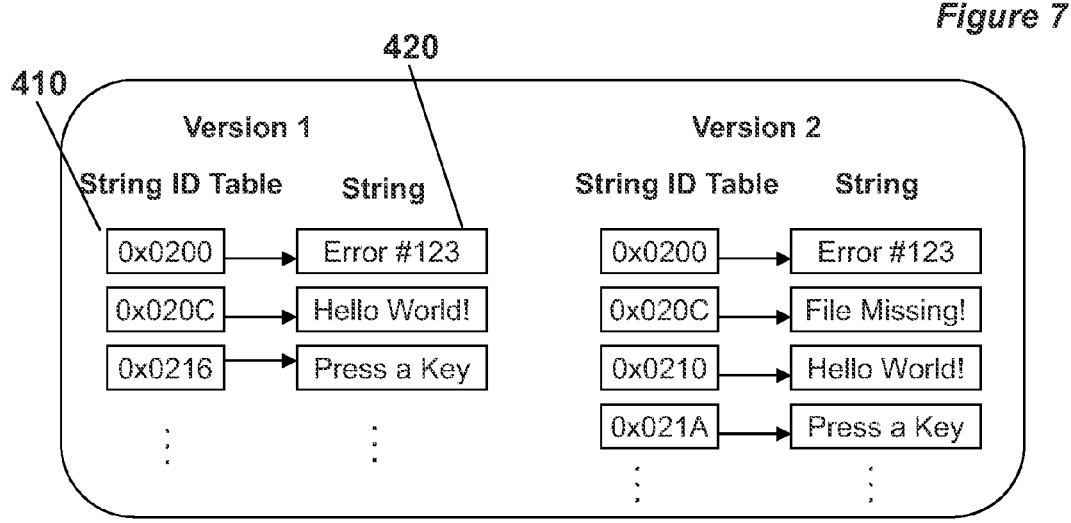
FIG. 7 shows a table of pointers from a software version 1 after preprocessing that involves the computation between adjacent pointers according to an embodiment of the invention.

FIG. 7 is a diagram showing a string ID table file 1 (410) as well as pointers to memory locations at which the string can be found that accords with FIG. 6. The inventors contemplate that real-world embodiments of the invention that might resemble FIG. 7 would likely contain many more than three or four entries. In some embodiments of the invention, the strings and string ID tables of FIG. 7 contain, perhaps, many thousands of entries.

In FIG. 7, software version 1 includes the string "Error #123" beginning at memory address 0x02 00 at string ID table 320. At memory address 0x02 0C, the string "Hello World!" begins. At memory address 0x02 16 the string "Press a Key" begins. FIG. 7, also includes version 2, which includes the strings mentioned above and further includes the string "File Missing!", which has been inserted into the static memory beginning at memory location 0x200c. In version 2, at the upper portion of FIG. 7, the string "Hello World!" begins at memory address 0x210, while the string "Press a Key" begins at memory address 0x021A.

In the lower portion of FIG. 7, a string ID table identified as "Modified Version 1" includes the strings "Error #123", which begins at memory location 0x200, and "Hello World!", which begins at memory location 0x210, and "Press a Key", which begins at memory location 0x21A (the latter two addresses shown in FIG. 6 using boldface type). Thus, as can be seen in modified version 1, the addresses for the strings "Hello World!" and "Press a Key" have been assigned the addresses assigned to those strings in version 2. The inventors contemplate that the remainder of the memory addresses of the entire string ID table of modified version 1, which may include many hundreds or thousands of entries, are incremented to align with (as much as possible) the string ID table of version 2.

Thus, in the embodiment of FIG. 7, version 1 and version 2 are compared by way of a preprocessor that results in an intermediate file, modified version 1, that includes most; if not all, of the changes that distinguish version 2 from version 1. Other changes, which might include program instructions such as branches and jumps present in version 2, not present in version 1, are also adjusted in order to create modified version 1. A differencing algorithm (such as Delta encoding) can then be applied between the preprocessed modified version 1 and version 2. The inventors have determined that when the differential compression is applied to the preprocessed file (modified version 1), the preprocessed update file is likely to result in an update file that is significantly smaller than would result if differencing algorithms were not applied to prior to preprocessing.

In an example (FIG. 8) that illustrates the method of FIG. 7, it is supposed that we wish to encode the string ID tables in version 1, and version 2.

```
Copy 0b, 0              // Copy 11 bytes (0b) from offset 0
                        {00 00 02 00 00 00 02 0c 00 00 02}
Add 5, 10, 00, 00, 02, 1a   // Add 5 new bytes {10, 00, 00, 02, 1a}
.....
.....
```

In a first step, a processor is instructed to first copy 0x200 and 0x20c. Following this initial copy operation, it is noticed that the additional "File Missing!" string is not present in version 1. Accordingly, the new string (File Missing) along with the address corresponding to the pointer to the memory location at which the string is located can be copied. At this point, the remaining portion of the table can be copied while incrementing each string ID table address by "020C". The advantages of this method become particularly apparent when tables that accord with FIG. 7 contain dozens or perhaps hundreds or more entries.

FIG. 9 is a diagram showing a string ID table file 1 as well as pointers to memory locations at which the string can be found according to an embodiment of the invention. Changes between string ID table file 1 and string ID table file 2 can be encoded in the following manner.

```
Copy 7, 0       // Copy 7 bytes starting from offset 0
                {00 00 02 00 00 00 02}
Add 1, 0c       // Add byte 0c
Copy 8, 4       // Copy 8 bytes starting from offset 4
                {00 00 02 10 00 00 02 1A}
.....
.....
```

Figure 8:
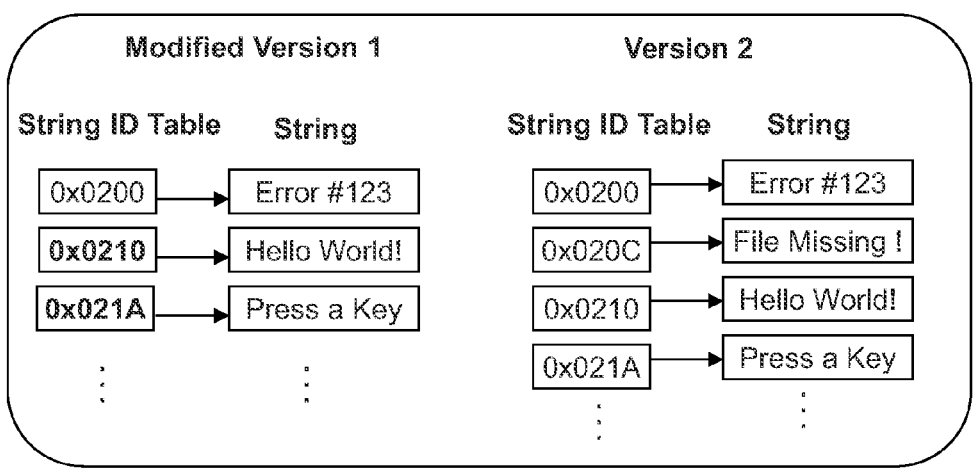
Figure 8:
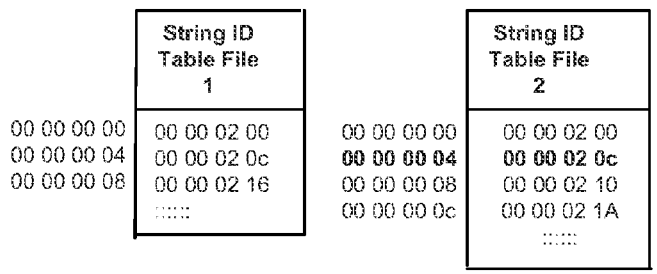

Which, for long tables, can be shown to be more compact than encoding tables in accordance with FIG. 8.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for updating a computer file using a preprocessor of a transmitter, the method comprising:
converting a first computer file to executable byte code, wherein the executable byte code includes a table of strings and a table of pointers;
receiving a second computer file that includes a change that distinguishes the second computer file from the first computer file;
converting the second computer file to executable byte code;
comparing at least a portion of the executable byte code of the second computer file with at least a portion of the executable byte code of the first computer file;
inserting, by the preprocessor of the transmitter, into the executable byte code of the first computer file, a modification that causes at least a portion of the executable byte code of the first computer file to resemble the executable byte code of the second computer file, wherein the modification includes a string and a pointer to the string inserted into the executable byte code of the first computer file;
generating an update using a generator that compares the first computer file as modified by the insertion and the second computer file; and
transmitting the update to a receiver.

2. The method of claim 1, further comprising encoding changes to the executable byte code of the first computer file by encoding the string and the pointer to the string by encoding only the differences between the executable byte code of the first and second computer files.

3. The method of claim 1, wherein the executable byte code of the first and second computer files are Dalvik executable files.

4. The method of claim 1, wherein the executable byte code of the first computer file and the executable byte code of the second computer file correspond to Java byte code executable by a Java virtual machine.

5. The method of claim 1, wherein the comparing step includes comparing the length of a string and the characters within the string and identifying a match when the length and characters of the strings are identical.

6. The method of claim 1, further comprising conveying at least one flag that identifies a table of the executable byte code of the first computer file that should be preprocessed.

7. The method of claim 1, wherein the first computer file is transmitted wirelessly to a plurality of receiving devices.

8. A system for preparing an update to an executable file using a preprocessor of a transmitter, the system comprising:
the transmitter including a processor configured to:
convert a first computer file to executable byte code, wherein the executable byte code includes a table of strings and a table of pointers;
receive a second computer file that includes a change that distinguishes the second computer file from the first computer file;
convert the second computer file to executable byte code, wherein the executable byte code includes a table of strings and a table of pointers;
compare at least a portion of the executable byte code of the second computer file with at least a portion of the executable byte code of the first computer file;
insert into the executable byte code of the first computer file, a modification that causes at least a portion of the executable byte code of the first computer file to resemble the executable byte code of the second computer file, wherein the modification includes a string and a pointer to the string inserted in to the executable byte code of the first computer file;
generate an update using a generator that compares the first computer file as modified by the insertion and the second computer file; and
transmit the update to a receiver.

9. The system of claim 8, wherein the preprocessor compares the length and characters of a string from the executable byte code of the first computer file with the length and characters of a string from the executable byte code of the second computer file to determine if the strings are identical.

10. The system of claim 8, wherein the preprocessor operates on Java executable byte code.

11. The system of claim 8, wherein the preprocessor operates on Dalvik executable byte code.

12. The system of claim 11, wherein the table of pointers in each of the first and second computer files includes pointers that are monotonically increasing in the table.

13. The system of claim 8, wherein the update is transmitted wirelessly to a plurality of receiving client devices.

* * * * *